(12) United States Patent
Salomon

(10) Patent No.: US 11,077,930 B2
(45) Date of Patent: Aug. 3, 2021

(54) CENTRAL AIRFOIL BOX COMPRISING A CONNECTING ROD AND AN ADJUSTABLE ANCHORING SYSTEM

(71) Applicant: Airbus Operations SAS, Toulouse (FR)

(72) Inventor: Julien Salomon, Sautron (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 221 days.

(21) Appl. No.: 16/454,942

(22) Filed: Jun. 27, 2019

(65) Prior Publication Data
US 2020/0001972 A1  Jan. 2, 2020

(30) Foreign Application Priority Data
Jun. 29, 2018 (FR) ...................................... 1855933

(51) Int. Cl.
*B64C 3/22* (2006.01)

(52) U.S. Cl.
CPC ..................................... *B64C 3/22* (2013.01)

(58) Field of Classification Search
CPC ........... B64C 3/18; B64C 3/182; B64C 3/185; B64C 3/22
See application file for complete search history.

(56) References Cited

U.S. PATENT DOCUMENTS

| | | | | | |
|---|---|---|---|---|---|
| 1,555,409 | A | * | 9/1925 | Gilmore .................... | B64C 3/00 244/123.4 |
| 1,619,372 | A | * | 3/1927 | Rohrbach ................. | B64C 3/00 244/123.4 |
| 3,075,403 | A | * | 1/1963 | Hepner ..................... | F16C 7/06 74/571.1 |
| 2005/0230528 | A1 | * | 10/2005 | Gay .......................... | B64C 3/18 244/34 R |

FOREIGN PATENT DOCUMENTS

| | | |
|---|---|---|
| EP | 1580120 A1 | 9/2005 |
| FR | 1503131 A | 11/1967 |
| FR | 3060679 A1 | 6/2018 |

OTHER PUBLICATIONS

French Search Report; priority document.

* cited by examiner

*Primary Examiner* — Justin M Benedik
(74) *Attorney, Agent, or Firm* — Greer, Burns & Crain, Ltd.

(57) ABSTRACT

A central airfoil box comprising two beams, each beam having a wall pierced with a first bore centered on a first axis, a connecting rod comprising, for each wall, a yoke joint having two flanks arranged on either side of the wall and pierced with a bore. Each yoke joint is fixed to the wall by a fixing system. The fixing system comprises a bearing lodging in the first bore, and being pierced with a second bore centered on a second axis parallel and offset to the first axis, a cylindrical shoulder, secured to and coaxial with the bearing and bearing against the wall, an outer perimeter of the shoulder having a plurality of splines, at least one block fixed to the wall around the first bore and configured to lodge in one of the splines, and a shaft lodging in the second bore and the yoke joint bores.

3 Claims, 3 Drawing Sheets

CENTRAL AIRFOIL BOX COMPRISING A CONNECTING ROD AND AN ADJUSTABLE ANCHORING SYSTEM

CROSS-REFERENCES TO RELATED APPLICATIONS

This application claims the benefit of the French patent application No. 1855933 filed on Jun. 29, 2018, the entire disclosures of which are incorporated herein by way of reference.

FIELD OF THE INVENTION

The present invention relates to a central airfoil box of an aircraft comprising at least one connecting rod and an adjustable anchoring system, as well as an aircraft comprising at least one such airfoil box.

BACKGROUND OF THE INVENTION

A central airfoil box of an aircraft consists of an assembly of beams and panels. To ensure the cohesion of the box, connecting rods are fixed between two beams facing one another. To this end, each of the two beams has a wall pierced with a bore and the connecting rod has, at each end, a yoke joint.

When the connecting rod is put in place, each yoke joint receives a shaft which passes through the yoke joint and one of the bores.

Because of the assembly tolerances, there is a dimensional spread between the theoretical center distance of the two bores and the real center distance. In order not to affect the mechanical performance of the connecting rods, their mounting must be done in such a way as to avoid generating installation stresses in the connecting rods. This stress-free installation mounting is guaranteed by the manufacturing of connecting rods to the real dimensions. To obtain a connecting rod which is to the real dimensions, an operator must then measure the real center distance, send the collected data to a manufacturer of connecting rods who will drill the yoke joints based on these data.

The assembly time is then relatively lengthy and, in case of the replacement of a connecting rod, the process must be carried out once again, hence the loss of aircraft operating time.

Furthermore, before each shaft of the connecting rod is put in place the box may undergo other assembly operations which affect the center distance, so the placement can then require the use of guiding inserts, which is also a waste of time.

SUMMARY OF THE INVENTION

One object of the present invention is to propose a central airfoil box comprising a connecting rod and an anchoring system which is adjustable and which makes it possible to fix an end of the connecting rod to a beam of the central airfoil box, allowing for a time saving in the fitting of the shaft and minimizing the management of stocks.

To this end, a central airfoil box is proposed that comprises:

two beams in which each has a wall pierced with a first bore centered on a first axis,
a connecting rod which comprises, for each wall, a yoke joint which has two flanks arranged on either side of the wall and pierced with a bore, and in which each yoke joint is fixed to the wall by a fixing system, the central airfoil box being characterized in that at least one of the fixing systems comprises an anchoring system which comprises:

a bearing which lodges in the first bore, and which is pierced with a second bore centered on a second axis parallel to the first axis and offset relative to the first axis,
a cylindrical shoulder, secured to and coaxial with the bearing and designed to come to bear against the wall, the outer perimeter of the shoulder having a plurality of splines,
at least one block fixed to the wall around the first bore and designed to lodge in one of the splines, and
a shaft which lodges in the second bore and the bores of the yoke joint.

Thus, the maintenance of such a central airfoil box is simplified because the length of the center distance between two bores is adjustable and it is then not necessary to use a specific connecting rod.

Advantageously, each spline takes the form of an outwardly open half-cylinder whose axis is parallel to the first axis and each block takes the form of a cylinder whose diameter is equal to the diameter of the splines and whose axis is parallel to the first axis.

The invention also proposes an aircraft comprising a central airfoil box according to one of the preceding variants.

BRIEF DESCRIPTION OF THE DRAWINGS

The features of the invention mentioned above, and others, will emerge more clearly on reading the following description of an exemplary embodiment, the description being given in relation to the attached drawings, in which.

DETAILED DESCRIPTION OF THE PREFERRED EMBODIMENTS

Figure 1:
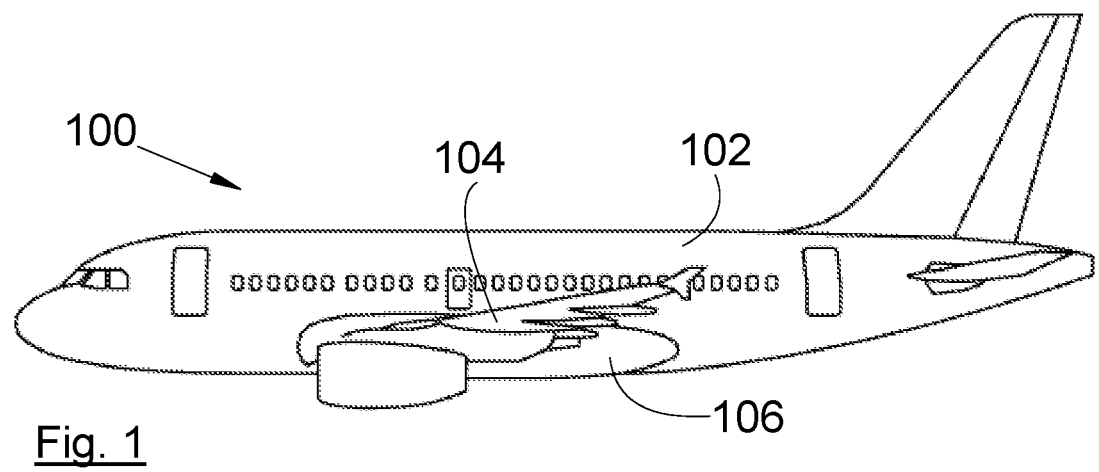
FIG. 1 is a side view of an aircraft according to the invention.

FIG. 1 shows an aircraft 100 which has a fuselage 102 and wings 104. The aircraft 100 also has a central airfoil box 106 which joins the two wings 104 with the fuselage 102.

Figure 2:
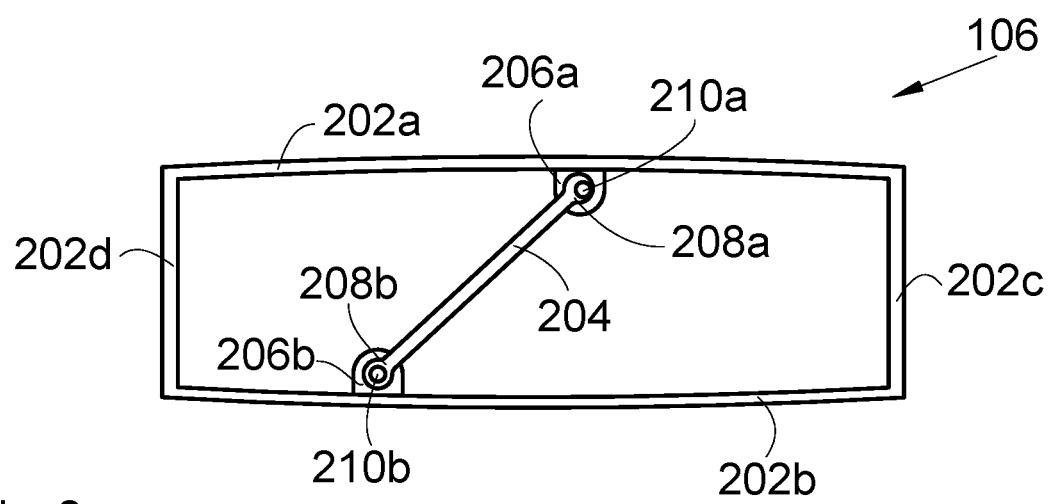
FIG. 2 is a cross-sectional view of a central airfoil box according to the invention.

FIG. 2 shows a simplified example of the box 106 in cross section. The box 106 is composed here of four beams 202a-d, two of which are linked by a connecting rod 204. To this end, each beam 202a-b has a wall 206a-b pierced with a first bore and, for each wall 206a-b, the connecting rod 204 has a yoke joint 208a-b which has two flanks arranged on either side of the wall 206a-b and pierced with a bore 366, and in which each yoke joint 208a-b is fixed to the wall 206a-b by a fixing system.

Figure 3:
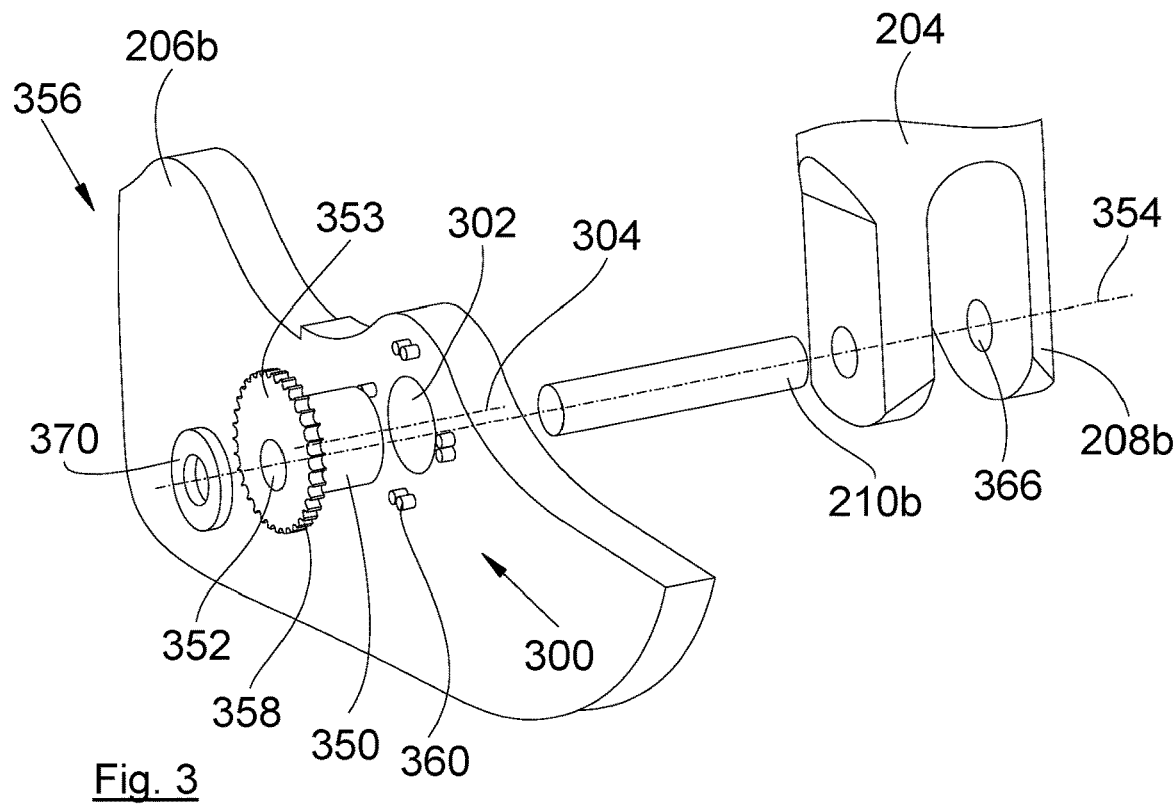
FIG. 3 is a perspective and exploded view of a connecting rod with an anchoring system according to the invention.

FIG. 3 shows the box 106 at the level of the wall 206b. The first bores 302 are centered on a first axis 304.

In the embodiment of FIG. 3, the fixing system at the wall 206b comprises an anchoring system 300 described below.

The fixing system at the wall 206a can also comprise an anchoring system 300, but it can take the conventional form of a shaft 210a which is fitted into the yoke joint 208a and the bore 302 of the wall 206a.

Hereinafter in the description, the invention is described more particularly relative to one of the ends of the connecting rods 204 but it can be implemented also at the other end.

The anchoring system 300 comprises a bearing 350 which lodges in the first bore 302 and which is pierced with a second bore 352 centered on a second axis 354 and in which a shaft 210b is fitted.

The second axis 354 is parallel to the first axis 304 and offset relative to the latter. Thus, the rotation of the bearing 350 in the first bore 302 about the first axis 304 makes it possible to displace the second bore 352 and therefore the shaft 210b which is fitted into it.

In order to block the bearing 350 in the chosen position, the anchoring system 300 comprises blocking means 356 which are designed to block the rotation of the bearing 350 in the first bore 302.

The anchoring system 300 comprises a cylindrical shoulder 353, secured to and coaxial with the bearing 350. The shoulder 353 is designed to come to bear against the wall 206b and the blocking means 356 are composed of a plurality of splines 358 which are produced on the outer perimeter of the shoulder 353 and at least one block 360 fixed to the wall 206b around the first bore 302 and designed to lodge in one of the splines 358.

The fact that the blocking means 356 are on the shoulder makes it possible to move their position away from the load transfer paths. Furthermore, the fact of distancing the splines 358 and the blocks 360 from the first axis 304 makes it possible to have a better adjustment accuracy because the angle between two successive splines 358 is smaller.

The anchoring system 300 also comprises the shaft 210b which lodges in the second bore 352 and the bores 366 of the yoke joint 208b.

Such an anchoring system 300 thus allows for an adjustment of the position of the shaft 210b relative to the first bore 302, and, in the case of the central airfoil box 106, it is then no longer necessary to have the connecting rods 204 custom-made whether for the first manufacture or upon the replacement of a connecting rod 204, which allows for a faster mounting. In effect, it is sufficient to pivot the bearing 350 into the appropriate position to obtain the desired center distance.

Each spline 358 takes the form of an outwardly open half-cylinder whose axis is parallel to the first axis 304. Each block 360 takes the form of a cylinder whose diameter is equal to the diameter of the splines 358 and whose axis is parallel to the first axis 304.

The centers of the splines 358 are distributed over a circle coaxial with the first axis 304 and the center of each block 360 is arranged on this same circle. When there are several blocks 360, they exhibit an angular distribution compatible with the angle that exists between two successive splines 358, that is to say, the angle between two blocks 360 is equal, to within a multiplying coefficient, to the angle between two successive splines 358. Thus, each block 360 can be positioned in one of the splines 358.

The range of adjustment of the center distance increases with the offset of the second bore 352.

Figure 4:
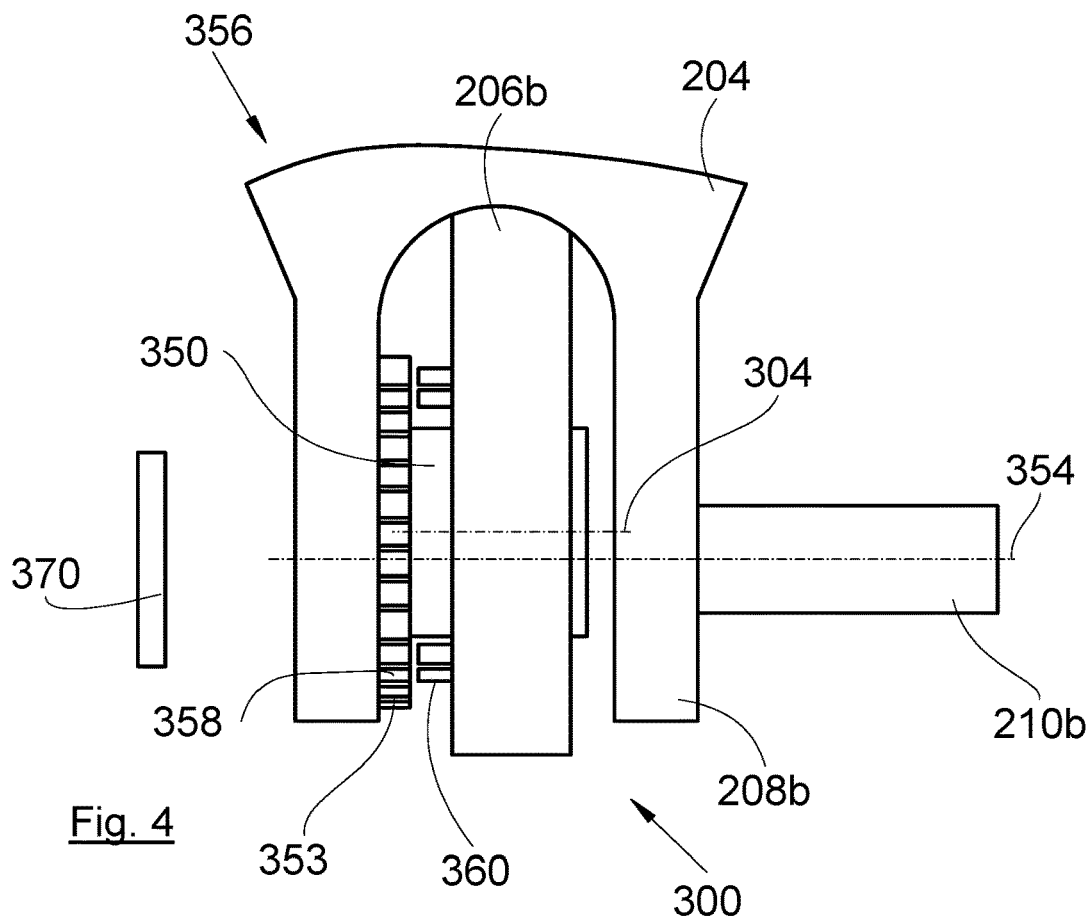
FIG. 4 is a profile view of the connecting rod of FIG. 3 in an assembly phase.

FIG. 4 shows a step in the mounting of the anchoring system 300.

The bearing 350 is partially driven into the first bore 302 leaving the shoulder 353 at a distance from the blocks 360 to allow the rotation of the bearing 350.

The shaft 210b is fitted into a bore 366 of the yoke joint 208b.

The bearing 350 is turned about the first axis 304 so as to bring the second bore 352 into line with the shaft 210b.

When the desired position is reached, the bearing 350 is driven home into the first bore 302 so that the blocks 360 are positioned in the splines 358 in order to block the rotation.

Figure 5:
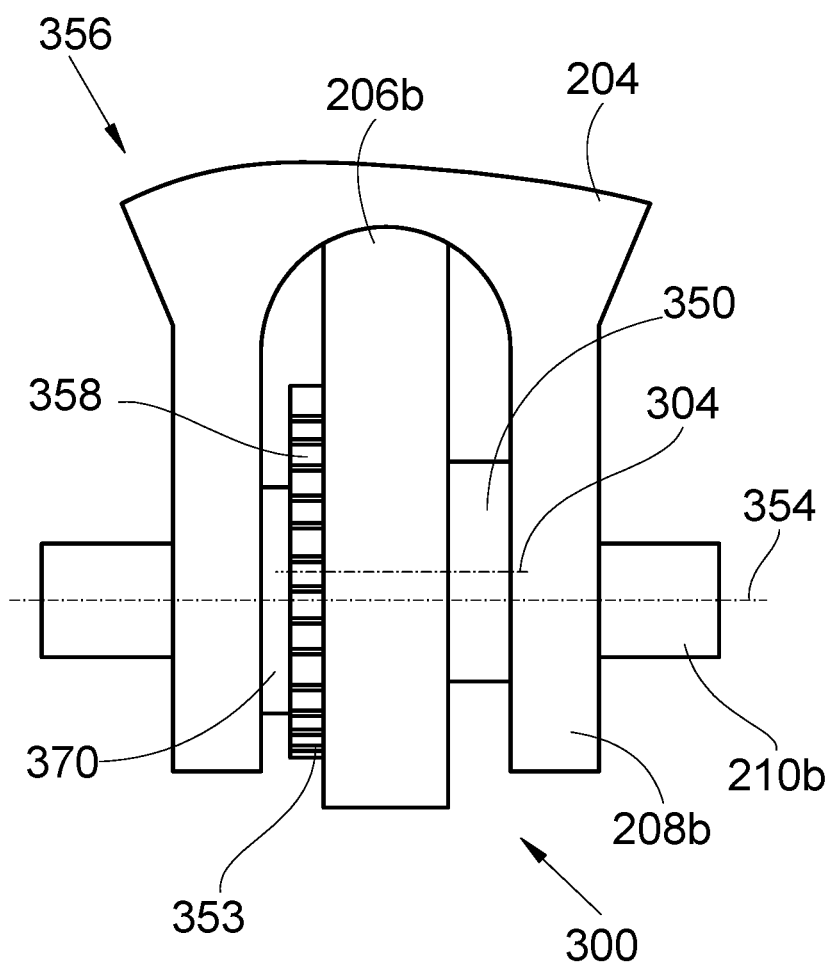
FIG. 5 is a profile view of the connecting rod of FIG. 4 assembled.

FIG. 5 shows the final assembly position.

The bearing 350 is driven into the first bore 302 and the blocks cooperate with the splines 358.

To prevent the displacement of the bearing 350, a washer 370 is arranged between the shoulder 353 and the facing wall of the yoke joint 208b.

The shaft 210b is driven in to pass through the bores 366 of the yoke joint 208b, the second bore 352 of the bearing 350 and the washer 370.

The shaft 210b is stopped in translation by any appropriate means such as, for example, nuts which are screwed onto the shaft 210b. The diameter of the bores 366 of the yoke joint 208b and the diameter of the second bore 352 are equal to the diameter of the shaft 210b to within the mounting tolerance.

The diameter of the second bore 302 is equal to the diameter of the bearing 350 to within the mounting tolerance.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A central airfoil box comprising:
   two beams, each beam having a wall pierced with a first bore centered on a first axis,
   a connecting rod comprising, for each wall, a yoke joint having two flanks arranged on either side of the wall and pierced with a bore, and in which each yoke joint is fixed to the wall by a fixing system,
   at least one of the fixing systems comprising an anchoring system which comprises:
      a bearing lodging in the first bore, and being pierced with a second bore centered on a second axis parallel to said first axis and offset relative to said first axis,
      a cylindrical shoulder, secured to and coaxial with the bearing and configured to come to bear against the wall, an outer perimeter of the shoulder having a plurality of splines,
      at least one block fixed to the wall around the first bore and configured to lodge in one of the splines, and
      a shaft lodging in the second bore and the bores of the yoke joint.

2. The central airfoil box according to claim 1, wherein each spline is formed as an outwardly open half-cylinder whose axis is parallel to the first axis and wherein each block is formed as a cylinder whose diameter is equal to the diameter of the splines and whose axis is parallel to the first axis.

3. An aircraft comprising a central airfoil box according to claim 1.

* * * * *